United States Patent [19]
Martin et al.

[11] Patent Number: 5,867,706
[45] Date of Patent: Feb. 2, 1999

[54] METHOD OF LOAD BALANCING ACROSS THE PROCESSORS OF A SERVER

[75] Inventors: Sean James Martin, West Hampstead; Andrew James Stanford-Clark, Eastleigh, both of United Kingdom

[73] Assignee: International Business Machines Corp., Armonk, N.Y.

[21] Appl. No.: 770,142

[22] Filed: Dec. 19, 1996

[51] Int. Cl.[6] .................................................. G06F 9/00
[52] U.S. Cl. ................ 395/675; 395/200.56; 395/200.65
[58] Field of Search .............................. 395/675, 200.56, 395/200.65, 200.75

[56] References Cited

U.S. PATENT DOCUMENTS

| | | | |
|---|---|---|---|
| 5,053,950 | 10/1991 | Naganuma et al. | 395/675 |
| 5,774,668 | 6/1998 | Choquier et al. | 395/200.53 |

FOREIGN PATENT DOCUMENTS

| | | | |
|---|---|---|---|
| 0648038 | 8/1994 | United Kingdom | H04L 29/06 |

OTHER PUBLICATIONS

Hui–I–Hsiao Multiprocessor Database Machines (1990/IEEE pp. 456–465).

S.L. Hardt–Kornacki and L.A. Ness optimization Model for Delivery of Interactive Multimedia Documents.

U. Nagaraj., U.S Shukla and A. Paulraj Design and Evaluation of High Performance File System for Message Passing Parallel Computers (1991/IEEE pp. 549–554).

"International Search Report", T. Michel, Mar. 12, 1997.

"Mobisaic: An Information System for a Mobile Wireless Computing Environment", G. M. Voelker and B. N. Bershad, pp. 185–190.

"Spinning the World–Wide Web An HTML Primer", James Powell, Virginia Polytechnic Institute and State University, pp. 54–59.

Primary Examiner—Dung C. Dinh
Assistant Examiner—Hieu C. Le
Attorney, Agent, or Firm—Jerry W. Herndon

[57] ABSTRACT

A server computer connectable to a network and having a plurality of processors (20, 30, 40) arranged to provide a service to one or more client computers connected to the network. The service Involves the provision of blocks of information to a client computer (50), and the processors have access to a data storage (120) in which data for the blocks of information is stored. Each processor in the server has block retrieval means (80), employed in response to a request from a client computer (50) for a particular block of information from that processor, to retrieve data from the data storage (120) to construct a file representing the requested block of information, the file including references to subsequent blocks of information requestable by the client (50). Additionally, load determining means (100) periodically determines activity data for the processor for inclusion In a load distribution record maintained for all of the processors of the server. Decision means (90) is then used which, for each reference to a subsequent block of information in the file constructed by the block retrieval means (80), determines, based on the load distribution record, which processor should service a request from the client computer (50) for that subsequent block of information, and includes an address for that processor in the file constructed by the block retrieval means (80). The file is then sent to the client computer (50).

In preferred embodiments, the service being provided is the World Wide Web (WWW) service, and the technique Is employed on a parallel Web server providing Web pages to clients over the Internet.

13 Claims, 2 Drawing Sheets

METHOD OF LOAD BALANCING ACROSS THE PROCESSORS OF A SERVER

FIELD OF THE INVENTION

The present invention relates to server computers connectable to a network for providing a service to one or more client computers also connected to the network. In particular it relates to server computers of the type having a plurality of processors arranged to provide the service, and concerns the problem of balancing the load on those processors resulting from requests from the client computers.

BACKGROUND OF THE INVENTION

There is increasing demand for high-powered server computers for networks in general, and in particular for the Internet. The Internet is a giant network made up of many smaller networks interlinked through the use of devices such as bridges and gateways. In theory, any computer connected to the Internet is capable of exchanging information with any other computer that is connected to the Internet. However, since computers often contain sensitive information, many computers and networks have security schemes that restrict the exchange of information among computers to various degrees.

Since the Internet represents a very powerful structure through which to disseminate information, a number of services have evolved which make use of the Internet to pass information from one computer to another. Examples of these services are FTP, News, Gopher, and the World Wide Web (or WWW as it will be referred to hereafter).

The WWW is one of the more well known, and most quickly expanding, of these services. The WWW supported by the Internet is capable of combining technologies such as voice, video and text, and presenting them in an on-demand, interactive fashion to anyone connected to the Internet. In essence, the WWW allows anyone connected to the Internet with a computer that has the appropriate software and hardware configuration to retrieve any HyperMedia document that has been made available anywhere on the Internet. The HyperMedia document is received as a file representing a block of information, and within that file are hyperlinks to other documents (or blocks of information) which may, for example, contain texts, sounds, images or movies.

As the computer receiving the HyperMedia document constructs the document for display to the user, it may use some of these hyperlinks in order to receive other files necessary to complete the display. For instance, hyperlinks may be used to access image files which are to be displayed as part of the document. Once the document has been constructed by the client computer and displayed to the user, the user may have the opportunity to select hyperlinks, for example by using a mouse or other input device to select a word or image on the screen, in order to request the document referenced by that Hyperlink.

As more and more people have started to use Internet services such as WWW, so the demands on the server computers has increased. In order to cope with these demands, parallel computers have started to be used as servers, these computers having a plurality of processors arranged to provide the service. By use of the multiple processors, very high volumes of server requests can be handled. An example of such a parallel computer is the IBM RISC System/6000 SP machines (IBM and RISC System/6000 are registered Trade Marks of International Business Machines Corporation).

However, a problem that arises in use of such parallel servers is that of balancing the incoming client traffic across the processors that are collaborating in the parallel system to serve documents (such as Web pages in WWW) and run service-based applications. With existing Load-Balancing mechanisms, there can be times when one particular processor becomes the focus of a large amount of traffic for a period of time. The technical term for this is that the processor gets "toasted". In this condition, the processor is overwhelmed by client requests, and grinds to a virtual halt, taking up to several minutes to service one request.

It is hence an object of the present invention to provide a mechanism to alleviate unbalanced load across the processors, thereby helping to avert this toasting effect.

SUMMARY OF THE INVENTION

Accordingly the present invention provides a server computer connectable to a network and having a plurality of processors arranged to provide a service to one or more client computers connected to the network, the service comprising the provision of blocks of information to a client computer, and the processors having access to a data storage in which data for the blocks of information is stored, the server computer comprising: block retrieval means provided on each of said plurality of processors, and employed in response to a request from a client computer for a particular block of information from a processor, to retrieve data from the data storage in order to construct a file representing the requested block of information, the file including references to subsequent blocks of information requestable by the client; load determining means for periodically determining activity data for the processors for inclusion in a load distribution record maintained for all of the processors of the server; decision means which, for each reference to a subsequent block of information in the file constructed by the block retrieval means, is arranged to determine, based on the load distribution record, which processor should service a request from the client computer for that subsequent block of information, and include an address for that processor in the file constructed by the block retrieval means; and delivery means for sending the file to the client-computer.

By using the approach of the present invention, the contents of the file are dynamically altered before being sent to the client to include the addresses of processors from which any subsequent blocks of information should be retrieved. The decision as to which processor is to service a request for a subsequent block of information is taken based on the load distribution record for the processors of the server. In this way, a more effective balancing of the load across the processors is achievable, and hence problems such as "toasting" of a particular processor can be alleviated.

In preferred embodiments, the load determining means is provided on each of said plurality of processors to determine activity data for each processor. Further, the decision means is also preferably provided on each of said plurality of processors. However, as an alternative to the preferred embodiment, one or more of the load determining means, decision means and delivery means can be provided on a specific one of the plurality of processors, or on a completely independent processor dedicated to performing the function of those elements. Hence, a processor could be dedicated to performing the function of the decision means, and every file constructed by a block retrieval means could be sent to that processor for processing by the decision means.

In preferred embodiments, if a plurality of the subsequent blocks of information will be required by the client computer when constructing the block of information represented by the file, then the decision means is arranged to determine how many of those subsequent blocks of information any particular processor will service requests for, such that the greater the load on a processor as indicated by the load distribution record, the less the number of subsequent blocks of information that processor will service requests for. Typically, one or more of the subsequent blocks of information will be image files which will be required by the client computer when constructing the block of information.

In preferred embodiments, the network is the Internet, the service is the World Wide Web service, and the blocks of information are Web pages. However, it will be apparent that the invention is applicable to any network and service wherein blocks of information are provided to a client which include references to subsequent blocks of information that the client may require, and which will need to be serviced by the server.

If the service is the World Wide Web service, then the address for a subsequent block of information included in the file by the decision means preferably takes the form of an address string including both an identifier for that block of information, and a unique identifier for the processor which the decision means has determined will service the request for that block of information.

Viewed from a second aspect, the present invention provides a method of operating a server computer connectable to a network and having a plurality of processors arranged to provide a service to one or more client computers connected to the network, the service comprising the provision of blocks of information to a client computer, and the processors having access to a data storage in which data for the blocks of information is stored, the method comprising the steps of: (a) in response to a request from a client computer for a particular block of information from a processor, employing that processor to retrieve data from the data storage in order to construct a file representing the requested block of information, the file including references to subsequent blocks of information requestable by the client; (b) employing a load determining means to periodically determine activity data for the processors for inclusion in a load distribution record maintained for all of the processors of the server; (c) for each reference to a subsequent block of information in the file constructed at step (a), determining, based on the load distribution record, which processor should service a request from the client computer for that subsequent block of information, and including an address for that processor in the file constructed at step (a); and (d) sending the file to the client computer.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1:
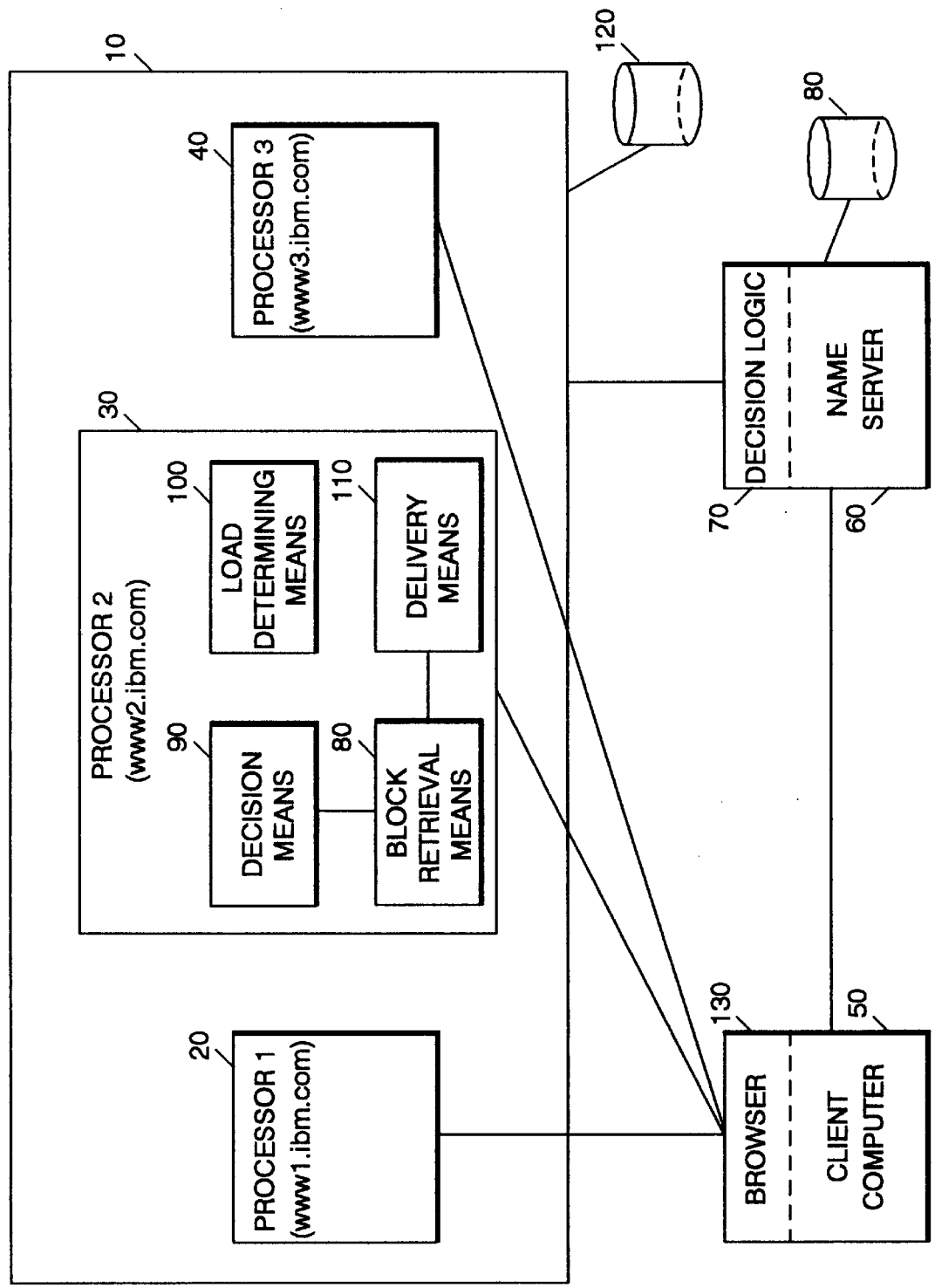
FIG. 1 is a schematic block diagram illustrating a server in accordance with a preferred embodiment of the present invention.

In the preferred embodiment of the present invention, we will consider the WWW service provided over the Internet, and describe a mechanism for providing secondary load-balancing across a number of processors collaborating in a parallel Web server.

Reviewing first the structure of the WWW, this is based on Universal Resource Locators (URLs), which can be regarded as specifying a particular page or file on the WWW. The URL denotes both the server machine, and the particular file or page on that machine. For example, a link might be to "http://www.ibm.com/example.html". The "http:" indicates that we are using the World-Wide Web, the "www.ibm.com" is the Internet name of the Web server on the network that we want to request the page from, and the "example.html" is the name of the page we wish to receive.

The client computer employs software generally referred to as a browser to provide the user with a simple GUI, allowing the user to navigate over the WWW to different URLs. Sometimes a user will specify a particular URL by name, but more often a user will jump from one URL to another by means of references within a page (a so-called "hyperlink"). Thus a particular word or symbol on a page can be associated with another URL, so that selection of that word or symbol, e.g. by clicking a mouse at the relevant location, causes the client computer to retrieve and display the page from the selected URL. This new page may be located on a completely different server from the first page. A word or symbol which maps to another URL is sometimes referred to as a "hot button" (or similar). There may be many hot buttons or hyperlinks in a single page.

There may be many pages or URLs resident on a single server. If a user at a client computer selects a URL on a particular server computer, then the server computer performs an action specific to that page. In some cases this can lead to the server computer launching an application, but in the majority of cases the server computer retrieves the requested page from a database of stored pages, and this is transmitted back over the Internet to the client computer for display to the user.

The pages are formatted in accordance with a standard format known as HTML. A typical Web page contains some text content, some embedded images (graphics), and a number of links to other pages which the person viewing the page can click on if they want more information about a certain topic. The images are themselves Web "pages" which the Web browser automatically requests from the server computer on behalf of the client when it is downloading the page from the server computer. These images are typically stored as separate graphics files at the server, for example in standard ".gif" or ".jpeg" format. The HTML text contains references to these graphics files, which prompt the client to also retrieve the specified files from the server, thereby allowing the client to display both the HTML text and associated images. The follow-on links from the page can either be to some other page on the same server as the base page came from, or to any other Web server on the Internet. For the purposes of illustrating the preferred embodiment of the present invention, we are interested in the graphic files, and the follow-on links which are on the same server as the base page. We will refer to both of these items as referenced Web pages hereafter.

There are a variety of web browser software commercially available for use on client computers, for example Web Explorer from IBM Corporation, and Mosaic from NCSA. All such browsers understand HTML and other WWW standard formats and can display or output correctly files in these formats. Similarly, the mechanisms for navigating between different URLs are also understood and implemented by such programs. Further information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994).

In the preferred embodiment of the present invention, a load balancing technique is used in association with the parallel server to make a number of the processors of the server appear to share the same Internet name. For example, with reference to FIG. 1, a parallel Web server 10, www.ibm.com, could be served by processors 20, 30, 40 called, say, www1.ibm.com, www2.ibm.com, and www3.ibm.com. The load-balancing software arranges for a request to www.ibm.com to be sent to one of the processors which forms part of that parallel Web server. A suitable load-balancing technique is discussed in Published European Patent application EP-A-0,648,038, which describes a dynamic load balancing technique to enable the load on a parallel server to be balanced across the various processors (or computers) forming the server. When a program on a client computer 50 wishes to connect to a processor of the parallel server 10, it communicates with a data processing system 60, often called a name server, to obtain the network address for the desired server. According to the technique described in EP-A-0,648,038, decision logic 70 is provided to study periodically the processors or computers in the parallel server 10 and, based on some configurable criteria, to select one of those processors. The configurable criteria can be chosen such that the least heavily loaded processor at the time the criteria are applied will be selected by the decision logic 70. The address for this processor is then associated with a generic server name in storage 80 available to the name server 60, so that each time a client program requests a machine address using the generic server name, it is given the address of the processor in the parallel server 10 that was most recently chosen by the decision logic 70. Hence, if www.ibm.com is the generic name, a request from the client 50 to the name server 60 for the Internet address of www.ibm.com will result in the client being provided with the Internet address of one of the three processors 20, 30, 40. For more details of this technique, reference should be made to EP-A-0,648,038.

Traditionally, a follow-on link which referred back to the same server (often called a 'Web site') as the base page would reference the same Internet name as that of the base page. For example, on the page http://www.ibm.com/first_page.html, a follow-on link might be to http://www.ibm.com/second_page.html. Since the client computer has already queried the name server 60 for the Internet address of the generic name, www.ibm.com, it would typically just use the same internet address again. Hence the follow-on request will be directed at the same processor as serviced the original request. Since the name server 60 is not consulted again to resolve the generic name www.ibm.com, any load balancing techniques employed at the name server will not be utilized. As a result, the actual processor that serviced the original request may be inundated with requests for follow-on links, this resulting in the 'toasting' effect mentioned earlier.

It is possible that the client computer can be arranged so that it will always consult the name server 60 for follow-on requests. However, in an attempt to increase efficiency of name servers, name servers tend to cache details of recent name requests. Typically, the client will not communicate directly with the name server 60. Instead, it will generally communicate with its local name server, which will communicate with a series of other name servers, until finally the request is passed to the name server 60, this being the name server that has "authority" over the parallel Web server 10. The Internet address resolved by the name server 60 will then be passed back through all these name servers, each of which may choose to cache the specific internet address that www.ibm.com has been resolved to. Hence, if the client is arranged so that each time it needs to communicate with www.ibm.com, it does contact a name server, it will still tend to receive the address previously resolved by the name server 60 since, for example, the local name server might decide that it already knows the Internet address for that name and thus there is no need to pass the request on further. Hence, it can be seen that the load balancing technique on the name server 60, whilst useful for the first request by a client for the address of the server, is not useful for any subsequent follow-on links to the same generic server name.

In order to overcome this problem, the parallel Web server of the preferred embodiment is provided with the ability to modify the content of Web pages in the server as they are served, and takes advantage of that facility to modify the name of the processors to which the follow-on links refer. Considering the FIG. 1 example, since www1.ibm.com, www2.ibm.com and www3.ibm.com are all servers in the www.ibm.com parallel Web server, a follow-on link which would otherwise refer to www.ibm.com can be changed to refer to a specific processor, for example www1.ibm.com. This forces the request for the follow-on page to go to a specific processor in the parallel Web server, and, as will be apparent, can be applied for all referenced Web pages, whether they be graphical images to be embedded in the currently displayed Web page, or follow-on links to different Web pages which the user can access from the displayed Web page.

By using the technique of the preferred embodiment to specify explicit processor names (e.g.. www1.ibm.com) in place of the generic name for the whole parallel Server (www.ibm.com), some control can be exercised over the load which will hit the various processors of the server in the near future. This control enables the likelihood of 'toasting' to be reduced.

The system of the preferred embodiment will now be described in more detail with reference to FIG. 1. In FIG. 1, the functional elements of processor 30 required to implement the preferred embodiment are shown. Preferably, all the other processors 20, 40 of the server 10 that are to provide the WWW service include the same elements, but these have been omitted from the figure for the sake of simplicity. As an alternative to the preferred embodiment, one or more of the functional elements other than the block retrieval means can be provided on a specific one of the plurality of processors, or on a completely independent processor dedicated to performing the function of those elements. Hence, a processor could be dedicated to performing the function of the decision means, and every Web page retrieved by a block retrieval means could be sent to that processor for processing by the decision means.

If, after consulting the name server 60, the client computer 50 is provided with the Internet address of the processor 30, it will contact the processor 30 directly with its request for a Web page. The block retrieval means 80 will access data in the storage device 120 in order to construct a file representing the Web page requested by the client 50. For any Web page referenced in that file, the decision means 90 will be employed to determine which specific processor should be chosen to handle subsequent requests for that Web page, and an identifier for that processor (e.g. www1.ibm.com) will be included at the appropriate point in the file.

As will be discussed in more detail later, when determining which processor will handle a follow-on request, the decision means 90 refers to a load distribution record providing information about the loads on all the processors of the server. The load determining means 100 is arranged to assess periodically the activity of the processor 30, and provide that information for inclusion in the load distribution record.

Once the decision means has determined which processors will handle any referenced web pages, and that information has been included in the file constructed by the block retrieval means, the file is passed to the delivery means 1 10 for sending to the browser 130 of the client computer 50. The browser 130 will then construct the Web page from the file for presentation to the user of the client computer 50, and will send requests for referenced Web pages directly to the processors identified in the file.

The manner in which the load distribution record is obtained will now be discussed. Statistics are gathered by the parallel Web server about how busy the processors of that server are, and these can then be collated to produce a "load distribution record". It will be apparent that this can be done in a number of ways. For instance, each processor can include a routine which periodically determines how busy that processor is, and then sends that information to some central location for inclusion in the load distribution record. The load distribution record may be kept on the data storage device 120 for access by each processor, or could instead be kept on the server in a portion of shared memory accessible by all the processors, if the architecture of the server supports such a shared memory arrangement. Alternatively, a series of messages can be sent over a communications network to each processor, such that each processor periodically assesses how busy it is, and then broadcasts that information to all the other processors in the parallel Web server. Each processor can then keep the load distribution record in its own local memory, and update it whenever it receives new load data from the other processors.

The decision means 90 of each processor 20, 30, 40 then uses this load distribution record to dynamically modify the Internet names of the follow-on links and images referenced in the Web pages that it subsequently serves. The profile is updated periodically, at a frequency which is configurable by the Web server administrator. The effect of doing this modification of content is that a processor which is beginning to get busy will have proportionately fewer follow-on requests directed to it, thus averting the serious performance impact when a processor gets "toasted". As the processor recovers, it will have more requests directed to it, and so the monitoring and load-tuning cycle will continue.

Figure 2:
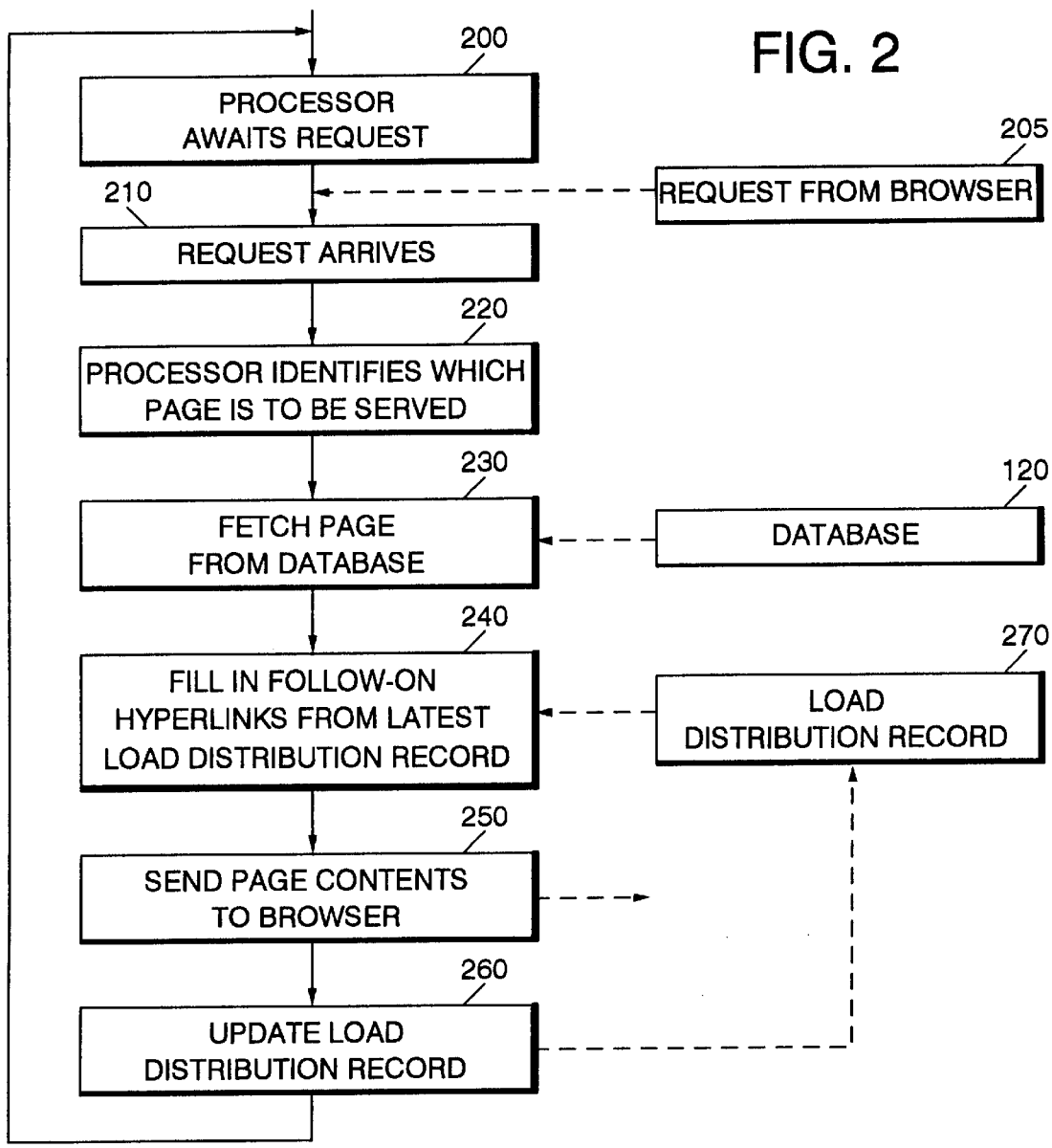
FIG. 2 is a flow diagram illustrating the processes carried out in the preferred embodiment by a processor of the server upon receipt of a request from a client.

The process carried out by a processor in accordance with the preferred embodiment upon receipt of a request from a client will now be described with reference to FIG. 2. At step 200, the processor awaits a request from a client. At step 210, a request 205 from a browser of a client computer is received. The processor then determines which Web page has been requested at step 220, and the block retrieval means 80 then fetches that page from the database 120 and constructs a file (step 230). Next, at step 240, any references to other web pages in that file are identified and the decision means 90 uses the latest load distribution record 270 to determine for each of those Web pages which processor should service a request for that web page. Hence, if a follow on Web page is called 'second_page.html', and the decision means determines that the processor 20 should service the request, the reference in the file will be changed to read 'http://www1.ibm.com/second_page.html'.

Once these follow-on hyperlinks have been completed by the decision means, the file is then sent to the client browser at step 250. Next, in preferred embodiments, the processor is arranged to reassess how busy it is at step 260, updating the load distribution record based on that assessment. Once this has been done, the processor returns to step 200 where it awaits the next request from a client.

As mentioned earlier, the follow-on Web pages referenced in the file may be categorized in to two types. Some may refer to Web pages which the browser will need to retrieve during the construction of the current web page for display to the user. For example, the basic file might include all the text for the Web page, but the data for any images to be displayed will not typically be included, but rather, references to Web pages including the images will be provided in the file returned to the browser. The browser will need to retrieve these web pages in order to reproduce the complete web page for the user.

The second type of Web page referenced in the file will be follow-on links which are not required by the browser in order to produce the initial web page for display. Instead, these will be pages which the user can select once the Web page has been displayed. Typically, the user will be able to select particular highlighted words or images on the screen, these words and images being associated with other Web pages. Upon such a selection, the browser will retrieve from the file the address of the processor which is to service requests for that Web page and will contact that processor directly.

Figure 3:
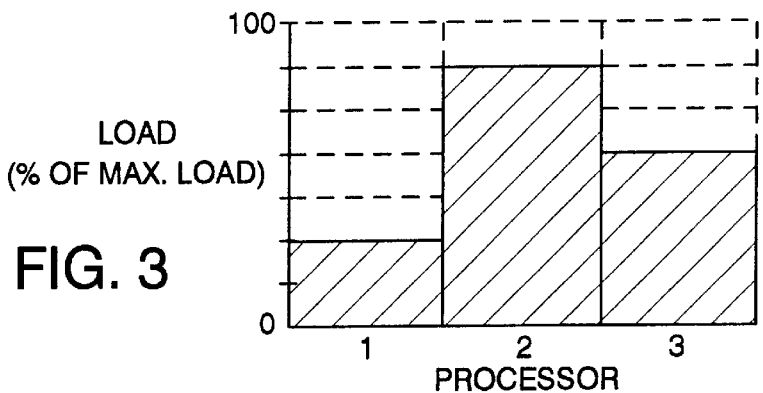
FIG. 3 illustrates how the load distribution record is used to determine which processors will service follow-on requests for blocks of information.

With particular regard to the first type of follow-on Web page identified above, FIG. 3 illustrates how the load distribution record can be used by the decision means 90 to split requests for this first type of Web page amongst the available processors of the server. Since this first type of web page will be required almost immediately by the browser so that it can construct the complete web page for display to the user, then it can be predicted that these requests will come back to the server fairly shortly after the original web page is delivered to the browser.

In FIG. 3, the load on each processor as a percentage of the maximum load is plotted for each processor. Typically the maximum load is determined as the point at which the processor is unable to provide an acceptable response time, this generally being determined by the server administrator. It will be apparent that there are clearly other ways in which the load can be assessed. From FIG. 3, it can be seen that processor 2 is most heavily loaded, followed by processor 3, whilst processor 1 is the least heavily loaded. If, for example, there are nine follow-on Web pages of the first type, then the decision means can use the percentage load figures for each processor to determine how many of those nine web pages should be serviced by each processor.

As illustrated in FIG. 3, the unused load for each processor has been divided into equal size blocks, such that a total of nine blocks are produced. A suitable way of balancing the load across the processors is to assign a particular processor the responsibility of servicing follow-on requests for a number of Web pages equal to the number of blocks associated with the unused load of that processor. Hence, in the example illustrated in FIG. 3, the address of processor 1 will be referenced for five Web pages, the address of processor 2 will be referenced for one Web page, and the address of processor 3 will be referenced for three Web pages.

From the above description, it will be apparent that in accordance with the preferred embodiments of the invention, the content of Web pages is dynamically altered as they are served, to change the Internet name of the server processor from which any follow-on link should be retrieved. The processor is chosen from a set of processors which can access the same Web content, and the choice is made based on the relative loading of those servers. In this way, a more effective load balance is achieved, and problems of processor "toasting" are averted before they become serious.

We claim:

1. A server computer connectable to a network and having a plurality of processors (20, 30, 40) arranged to provide a service to one or more client computers connected to the network, the service comprising the provision of blocks of information to a client computer (50), and the processors having access to a data storage (120) in which data for the blocks of information is stored, the server computer comprising:

block retrieval means (80) provided on each of said plurality of processors, and employed in response to a request from a client computer (50) for a particular block of information from a processor, to retrieve data from the data storage (120) to construct a file representing the requested block of information, the file including references to subsequent blocks of information requestable by the client (50);

load determining means (100) for determining periodically activity data for the processors;

decision means (90) which, for each reference to a subsequent block of information in the file constructed by the block retrieval means (80), is arranged to determine, based on the activity data, which processor should service a request from the client computer (50) for that subsequent block of information, and to include an address for that processor in the file constructed by the block retrieval means (80); and delivery means (110) for sending the file to the client computer (50).

2. A server computer as claimed in claim 1, wherein the load determining means (100) is provided on each of said plurality of processors to determine activity data for each processor.

3. A server computer as claimed in claim 1, wherein the decision means (90) is provided on each of said plurality of processors.

4. A server computer as claimed in claim 1 or claim 2 or claim 3, wherein if a plurality of the subsequent blocks of information will be required by the client computer (50) when constructing the block of information represented by the file, then the decision means (90) is arranged to determine how many of those subsequent blocks of information any particular processor will service requests for, such that the greater the load on a processor, the less the number of subsequent blocks of information that processor will service requests for.

5. A server as claimed in claim 4, wherein one or more of the subsequent blocks of information are image files which will be required by the client computer (50) when constructing the block of information.

6. A server as claimed in claim 4, wherein the network is the Internet.

7. A server as claimed in claim 6, wherein the service is the World Wide Web service, and the blocks of information are Web pages.

8. A server as claimed in claim 7, wherein the address for a subsequent block of information included in the file by the decision means (90) takes the form of an address string including both an identifier for that block of information, and a unique identifier for the processor which the decision means (90) has determined will service the request for that block of information.

9. A method of operating a server computer connectable to a network and having a plurality of processors (20, 30, 40) arranged to provide a service to one or more client computers connected to the network, the service comprising the provision of blocks of information to a client computer (50), and the processors having access to a data storage (120) in which data for the blocks of information is stored, the method comprising the steps of:

(a) in response to a request from a client computer (50) for a particular block of information from a processor, employing that processor to retrieve data from the data storage (120) to construct a file representing the requested block of information, the file including references to subsequent blocks of information requestable by the client (50);

(b) employing a load determining means (100) to determine periodically activity data for all of the processors of the server;

(c) for each reference to a subsequent block of information in the file constructed at step (a), determining, based on the activity data, which processor should service a request from the client computer (50) for that subsequent block of information, and including an address for that processor in the file constructed at step (a); and (d) sending the file to the client computer (50).

10. A method as claimed in claim 9, wherein each of said plurality of processors includes a load determining means (100) arranged to perform said step (b).

11. A method as claimed in claim 9, wherein each of said processors includes a decision means (90) arranged to perform said step (c).

12. A method as claimed in claim 9 or claim 10 or claim 11, wherein if a plurality of the subsequent blocks of information will be required by the client computer (50) when constructing the block of information represented by the file, then said step (c) includes determining how many of those subsequent blocks of information any particular processor will service requests for, such that the greater the load on a processor, the less the number of subsequent blocks of information that processor will service requests for.

13. A method as claimed in claim 12, wherein the address for a subsequent block of information included in the file at said step (c) takes the form of an address string including both an identifier for that block of information, and a unique identifier for the processor which at step (c) has been determined as the processor which will service the request for that block of information.

\* \* \* \* \*